(12) United States Patent
Ma

(10) Patent No.: US 12,210,194 B2
(45) Date of Patent: Jan. 28, 2025

(54) EXPANDED BEAM OPTICAL FERRULES

(71) Applicant: 3M INNOVATIVE PROPERTIES COMPANY, St. Paul, MN (US)

(72) Inventor: Changbao Ma, Austin, TX (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 183 days.

(21) Appl. No.: 17/798,941

(22) PCT Filed: Feb. 4, 2021

(86) PCT No.: PCT/IB2021/050912
§ 371 (c)(1),
(2) Date: Aug. 11, 2022

(87) PCT Pub. No.: WO2021/161140
PCT Pub. Date: Aug. 19, 2021

(65) Prior Publication Data
US 2023/0056995 A1    Feb. 23, 2023

Related U.S. Application Data

(60) Provisional application No. 62/976,560, filed on Feb. 14, 2020.

(51) Int. Cl.
*G02B 6/38* (2006.01)
*G02B 6/42* (2006.01)

(52) U.S. Cl.
CPC .......... *G02B 6/3829* (2013.01); *G02B 6/3818* (2013.01); *G02B 6/3821* (2013.01);
(Continued)

(58) Field of Classification Search
CPC .. G02B 6/3829; G02B 6/4284; G02B 6/4214; G02B 6/3885; G02B 6/3839;
(Continued)

(56) References Cited

U.S. PATENT DOCUMENTS 7,934,941 B2 * 5/2011 Hayauchi ............. H01R 4/2433
439/417
8,038,459 B2 * 10/2011 Hayauchi ............. H01R 13/629
439/301
(Continued)

FOREIGN PATENT DOCUMENTS

| JP | 2007171556 A | * 7/2007 |
|---|---|---|
| JP | 2011013665 A | 1/2011 |
| WO | 2022195443 A1 | 9/2022 |

OTHER PUBLICATIONS

International Search Report for PCT International Application No. PCT/IB2021/050912, mailed on Apr. 13, 2021, 4 pages.

*Primary Examiner* — Ryan A Lepisto
*Assistant Examiner* — Erin D Chiem
(74) *Attorney, Agent, or Firm* — Jonathan L. Tolstedt

(57) ABSTRACT

An optical ferrule (200) includes an input surface (10) for receiving and transmitting a central light ray (21) from an optical fiber (20) attached to the optical ferrule. A light redirecting side (30) receives, along a first direction (40), the central light ray (21) transmitted by the input surface (10) and redirects the received light along a different second direction (41). The redirected central light ray (23) exits the optical ferrule through an output surface (50) of the optical ferrule. As the central light ray (21) propagates in the optical ferrule from the input surface (10) to the output surface (50), the central light ray (21) propagates through distinct first and second portions (60,70) of the optical ferrule having different respective first and second compositions.

9 Claims, 8 Drawing Sheets

(52) U.S. Cl.
CPC ............ *G02B 6/383* (2013.01); *G02B 6/3831* (2013.01); *G02B 6/3838* (2013.01); *G02B 6/3839* (2013.01); *G02B 6/3882* (2013.01); *G02B 6/3885* (2013.01); *G02B 6/38875* (2021.05); *G02B 6/3888* (2021.05); *G02B 6/4214* (2013.01)

(58) Field of Classification Search
CPC .... G02B 6/3821; G02B 6/3882; G02B 6/383; G02B 6/38875; G02B 6/3818; G02B 6/3888; G02B 6/3838; G02B 6/3831
See application file for complete search history.

(56) References Cited

U.S. PATENT DOCUMENTS

| | | | | |
|---|---|---|---|---|
| 9,368,913 | B2* | 6/2016 | Saito | H01R 13/646 |
| 9,645,325 | B2* | 5/2017 | Fortusini | G02B 6/3885 |
| 9,720,184 | B2* | 8/2017 | Benner | G02B 6/3829 |
| 10,162,123 | B2* | 12/2018 | Smith | G02B 6/3831 |
| 10,241,275 | B2* | 3/2019 | Li | G02B 6/3839 |
| 10,557,995 | B2* | 2/2020 | Smith | G02B 6/3885 |
| 2012/0135621 | A1* | 5/2012 | Hayauchi | H01R 12/91 |
| | | | | 439/247 |
| 2012/0189252 | A1 | 7/2012 | Bhagavatula et al. | |
| 2017/0168248 | A1* | 6/2017 | Hayauchi | G02B 6/3845 |
| 2018/0217337 | A1* | 8/2018 | Smith | G02B 6/3897 |
| 2018/0284354 | A1* | 10/2018 | Smith | G02B 6/3817 |

* cited by examiner

EXPANDED BEAM OPTICAL FERRULES

CROSS REFERENCE TO RELATED APPLICATIONS

This application is a national stage filing under 35 U.S.C. 371 of PCT/IB2021/050912, filed Feb. 4, 2021, which claims the benefit of U.S. Application No. 62/976,560, filed Feb. 14, 2020, the disclosures of which are incorporated by reference in their entireties herein.

TECHNICAL FIELD

This disclosure relates generally to optical coupling devices such as optical ferrules, particularly expanded beam optical ferrules.

BACKGROUND

Optical communications are increasingly used in systems to achieve data communication with a greater bandwidth and/or lower electromagnetic interference as compared to electrical communications. In some systems, optical and electrical communication interconnections may be used. Optical fibers may be employed for optical input/output, and for some applications, optical fibers may be coupled to other optical fibers and/or system components by an optical connector. Optical connectors are used for optical communications in a variety of applications including telecommunications networks, local area networks, data center links, and internal links in computer devices. Optical connectors, including expanded beam optical connectors, can include optical ferrules having elements for receiving and securing optical waveguides, elements for affecting light from the optical waveguides, and features for aligning the optical ferrule to a mating optical ferrule. Injection molding of polymer materials for making expanded beam fiber optic ferrules is a widely used, cost-effective method for high volume production of optical ferrules.

SUMMARY

Various aspects and embodiments described herein relate to optical connectors and optical ferrules.

Some aspects of the disclosure relate to an optical ferrule including an input surface for receiving and transmitting a central light ray from an optical fiber attached to the optical ferrule. A light redirecting side of the optical ferrule receives, along a first direction, the central light ray transmitted by the input surface and redirects the received light along a different second direction. The redirected central light ray exits the optical ferrule through an output surface of the optical ferrule. As the central light ray propagates in the optical ferrule from the input surface to the output surface, the central light ray propagates through distinct first and second portions of the optical ferrule having different respective first and second compositions.

Some other aspects of the disclosure relate to an optical ferrule including a light input surface, a light redirecting surface, a light output surface, a glass portion including glass and at least one of the light input and output surfaces, and a polymeric portion including a polymer and disposed between the glass portion and the light redirecting surface. The optical ferrule is so configured that light entering the optical ferrule through the light input surface exits the optical ferrule though the light output surface after being redirected by the light redirecting surface. While propagating from the light input surface to the light output surface, the light propagates through the glass and polymeric portions of the optical ferrule.

Some other aspects of the disclosure relate to an optical ferrule including a groove for receiving and supporting an optical waveguide. The groove includes opposing open front and back ends. A light redirecting member of the optical ferrule includes an input surface for receiving light from an optical waveguide received and supported in the groove. A light redirecting side of the light redirecting member changes a direction of light received from the input surface. The open back end of the groove is disposed between the open front end of the groove and the input surface. The open back end of the groove and input surface define a recessed region therebetween. An optically transparent glass insert is disposed in the recessed region and substantially conforms in shape to an internal shape of the recessed region.

Other aspects of the disclosure relate to a hybrid optical ferrule including a light input surface, a light redirecting side and a light output surface. A first ferrule portion has a first optical intensity damage threshold I1. A second ferrule portion has a second optical intensity damage threshold I2, where $I2 \leq I1/5$. The hybrid optical ferrule is so configured that light entering the optical ferrule through the light input surface exits the optical ferrule though the light output surface after being redirected by the light redirecting surface and propagating through the first and second ferrule portions. The light has maximum intensities Imax1 and Imax2 while propagating through the respective first and second ferrule portions. The first and second ferrule portions are so arranged that $Imax2 < I2 < Imax1 < I1$.

Some other aspects of the disclosure relate to an optical ferrule assembly including an optical ferrule according to one or more aspects of the disclosure, and an optical waveguide received and supported in the groove.

These and other aspects of the present application will be apparent from the detailed description below. In no event, however, should the above summaries be construed as limitations on the claimed subject matter, which subject matter is defined solely by the attached claims.

BRIEF DESCRIPTION OF DRAWINGS

The various aspects of the disclosure will be discussed in greater detail with reference to the accompanying figures where, FIGS. 1-3 schematically show different views of an optical ferrule according to certain embodiments.

The figures are not necessarily to scale. Like numbers used in the figures refer to like components. However, it will be understood that the use of a number to refer to a component in a given figure is not intended to limit the component in another figure labelled with the same number.

DETAILED DESCRIPTION OF ILLUSTRATIVE EMBODIMENTS

Figure 1:
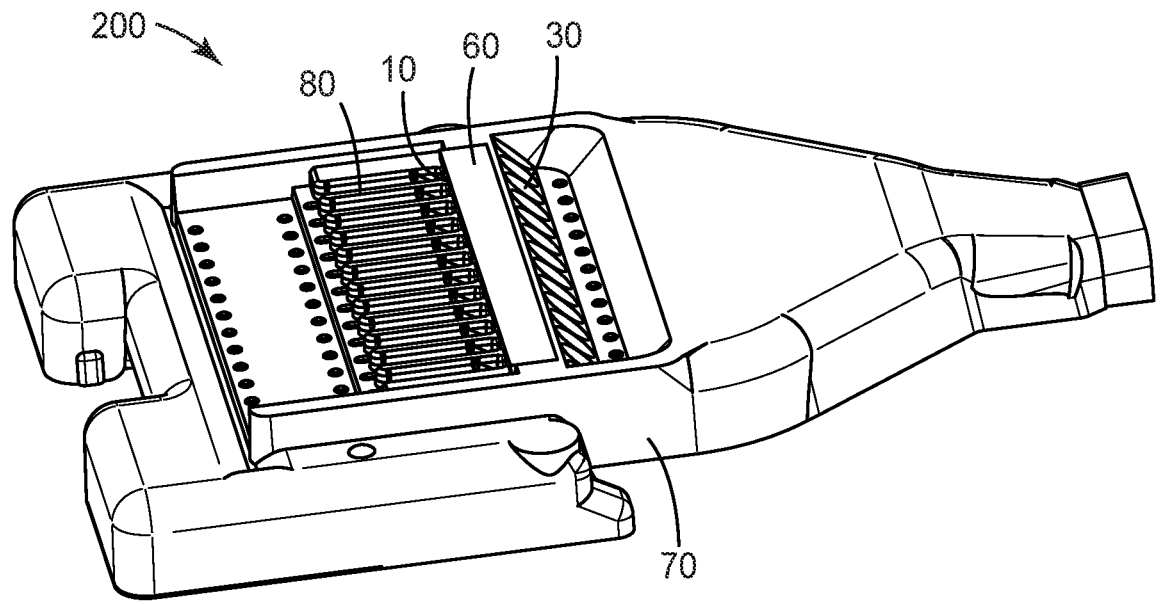
Figure 2:
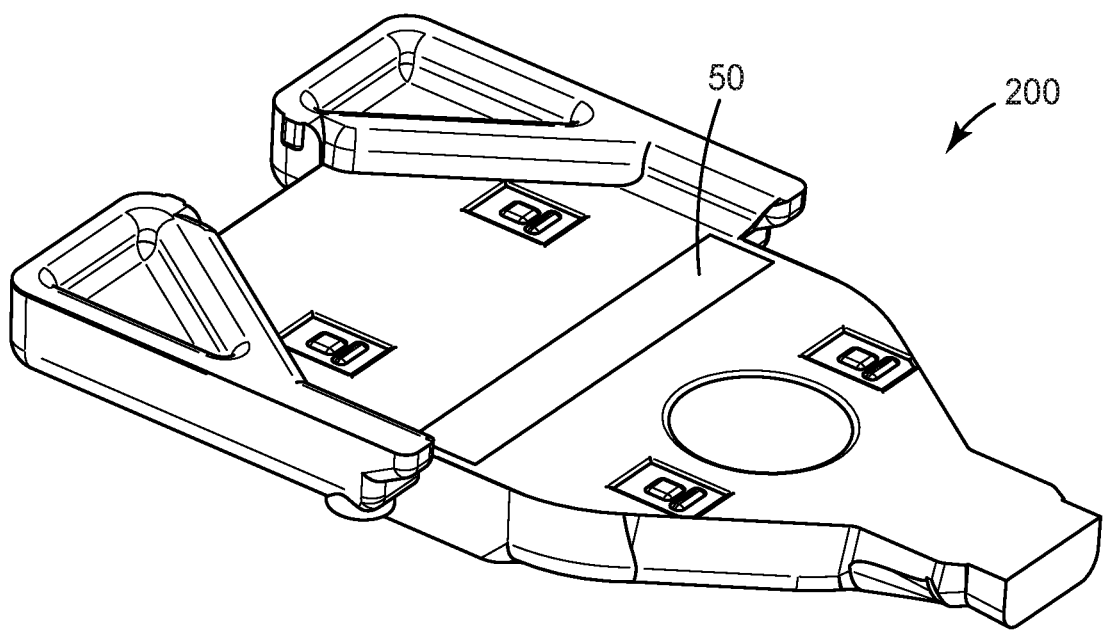
Figure 3:
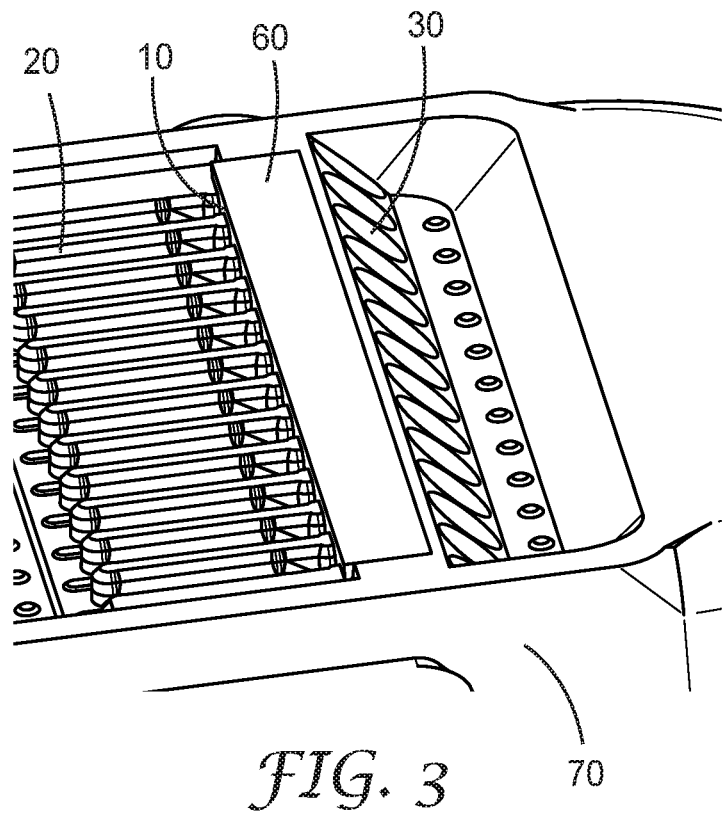

In the following description, reference is made to the accompanying drawings that form a part hereof and in which various embodiments are shown by way of illustration. It is to be understood that other embodiments are contemplated and may be made without departing from the scope or spirit of the present description. The following detailed description, therefore, is not to be taken in a limiting sense.

Expanded optical beams may be used in connectors to provide an optical connection that is less sensitive to dust and other forms of contamination so that alignment tolerances may be relaxed. Generally, an expanded beam is a beam that is larger in diameter than the core of an associated optical waveguide (usually an optical fiber, e.g., a multi-mode fiber for a multi-mode communication system). The connector is generally considered an expanded beam connector if there is an expanded beam at a connection point. In certain examples, the expanded beam ferrule can include a beam expansion section (e.g., a GRIN optical fiber) for expanding the optical beam diameter of an optical signal that passes through the beam expansion section. The expanded beam is obtained by diverging a light beam from a source or optical fiber. In many cases, the diverging beam is processed by optical elements such as a lens or mirror into an expanded beam that is approximately collimated. The expanded beam is then received by focusing the beam via another lens or mirror.

Injection molding of polymer materials is a widely used, cost-effective method for making expanded beam fiber optic ferrules. Due to high power density from the fibers, especially single mode fibers, the polymer materials may experience photodegradation, which may negatively affect the performance of the connectors. The light beam coming out of the fibers diverges in the ferrule material and the area in front of the fiber facets has the highest power density, which experiences the highest degradation. Embodiments described herein address these and other challenges.

Some embodiments of the present disclosure relate to optical ferrules including a slab made of suitable material(s) that can handle high power density of light in the area that has the densest power in the ferrule, for example, the area in front of the fiber facet, to reduce or eliminate the photodegradation.

Some embodiments of the optical ferrule (200) are illustrated in FIGS. 1-4. The optical ferrule (200) may have a unitary construction (e.g., a construction including a first piece integrally formed on a second piece). In other aspects, the optical ferrule may be a ferrule that includes pieces formed separately and adhered or otherwise fastened together. The ferrule may be made from any suitable materials including polymers or ceramics. The ferrule may include one or more elements that guide or help guide the ferrule and a mating ferrule into alignment when the two ferrules are mated. In some aspects, the optical ferrule and/or the mating optical ferrule may be hermaphroditic.

Figure 4:
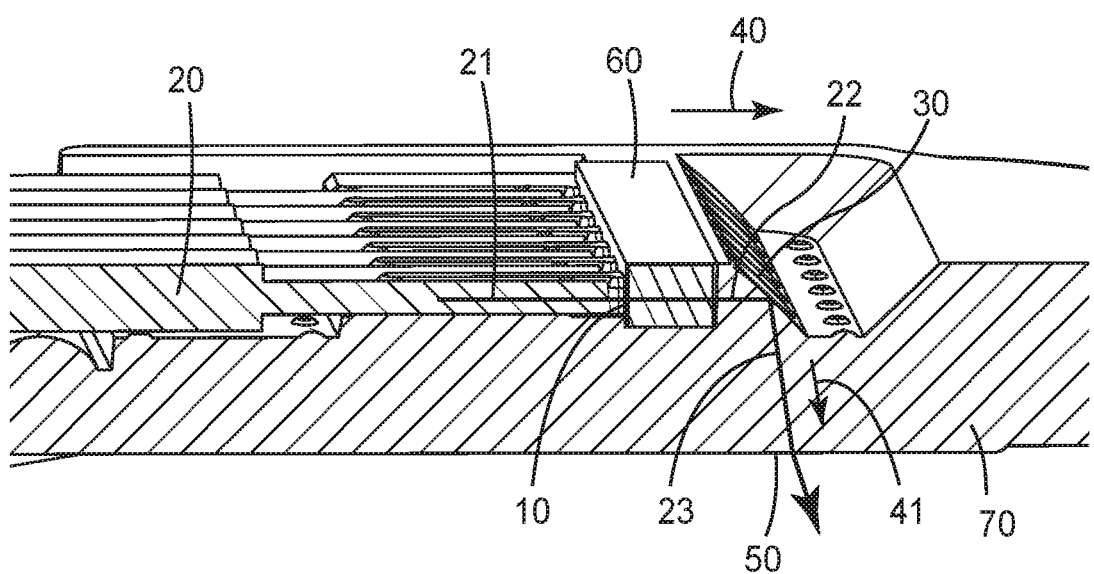
FIG. 4 schematically shows a cross sectional view of an optical ferrule according to an aspect of the disclosure.

In some aspects, the optical ferrule (200) includes a light input surface (10), a light redirecting surface (30), and a light output surface (50). The optical ferrule (200) is so configured that light (21) entering the optical ferrule through the light input surface (10) exits the optical ferrule though the light output surface (50) after being redirected by the light redirecting surface (30). For instance, as best shown in FIG. 4, a central light ray (21) from an optical waveguide (20) attached to the optical ferrule (200) is received and transmitted by the input surface (10). The light redirecting surface (30) receives the central light ray (21) transmitted by the input surface (10) along a first direction (40) and redirects the received light (22) along a different second direction (41). The redirected central light ray (23) exits the optical ferrule (200) through an output surface (50) of the optical ferrule and may be configured to enter a mating optical ferrule (not shown).

The optical ferrule (200) may include a groove (80) for receiving and supporting the optical waveguide (20). In some aspects, the optical ferrule (200) may include a plurality of grooves (80), substantially parallel to each other, for receiving and securing a plurality of optical waveguides (20). Each optical waveguide (20) may be received and secured in a different groove. The optical waveguides (20) according to some embodiments may be optical fibers. At the point of attachment, the fiber buffer coating and protective jacket, if any, of the optical fibers (20) are stripped away to allow only the bare optical fibers to lie aligned and permanently secured to the grooves.

In some embodiments, the plurality of optical waveguides (20) may form a waveguide array of an optical cable. The term optical waveguide is used herein to refer to an optical element that propagates signal light. An optical waveguide may have at least one core with a cladding, wherein the core and cladding are configured to propagate light, e.g., by total internal reflection. An optical waveguide may be, for example, a single or multi-mode waveguide, a single core optical fiber, a multi-core optical fiber, a polymeric waveguide, or planar waveguides disposed on a substrate. A waveguide may have any suitable cross sectional shape, e.g., circular, square, rectangular etc. The individual waveguides in the waveguide array may be optical fibers made of glass with a protective buffer coating. Multiple parallel waveguides of a waveguide array may be enclosed by a jacket.

Figure 6:
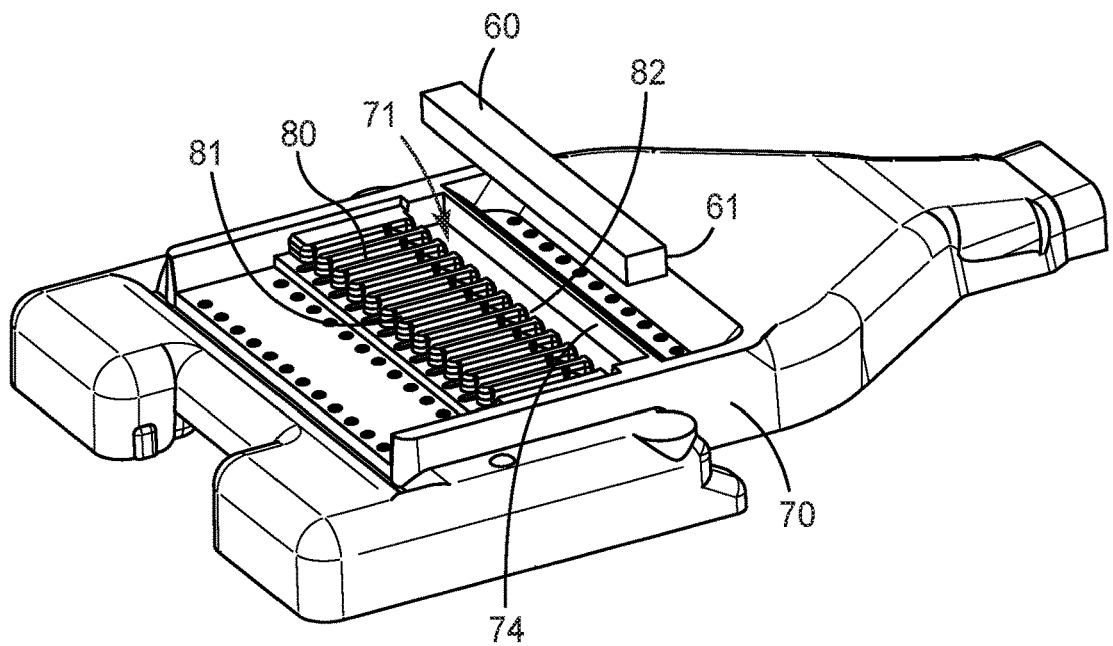
FIG. 6 schematically shows an optical ferrule according to certain other aspects of the disclosure.

In some embodiments, as the central light ray (21) propagates in the optical ferrule from the input surface (10) to the output surface (50), the central light ray (21) propagates through distinct first (60) and second (70) portions of the optical ferrule. In some embodiments, the first (60) and second (70) portions have different respective first and second compositions. The first portion (60) may be disposed within a receiving space (71) defined in the optical ferrule (200) as shown in FIG. 6. The first composition may include glass and the second composition may include a polymer. In other embodiments, the first composition may include any material that can handle high power density of light at suitable wavelengths. For instance, the material may be curable adhesives, or sol-gel or nanocomposites that can be filled into the receiving space (71) and cured.

Figure 5:
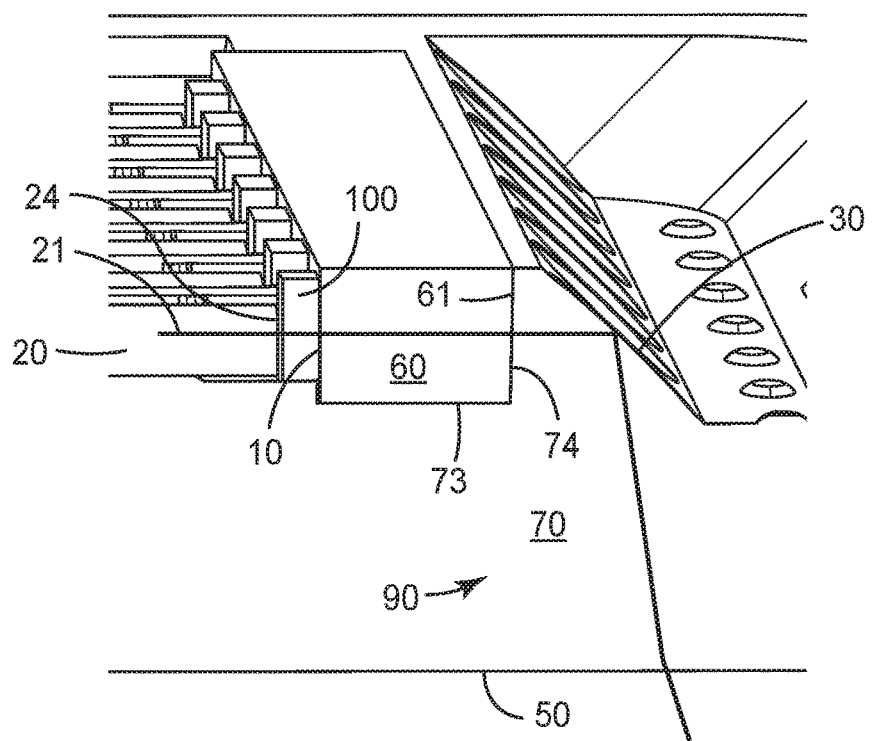
FIG. 5 schematically shows light propagating through distinct first and second portions of the optical ferrule.
Figure 9:
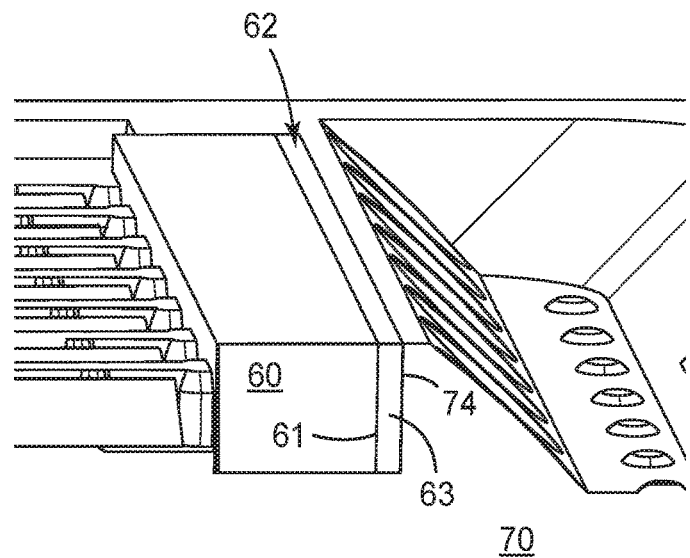
FIG. 9 schematically shows a partial view of the optical ferrule according to some aspects of the disclosure.
Figure 10:
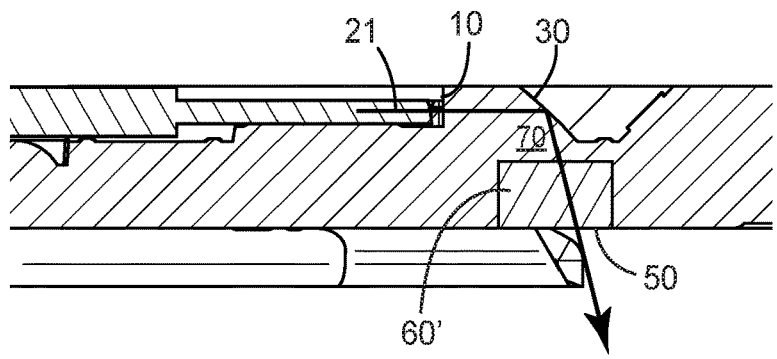
FIGS. 10-12 schematically show different cross sectional views of the optical ferrules according to certain aspects of the disclosure.
Figure 11:
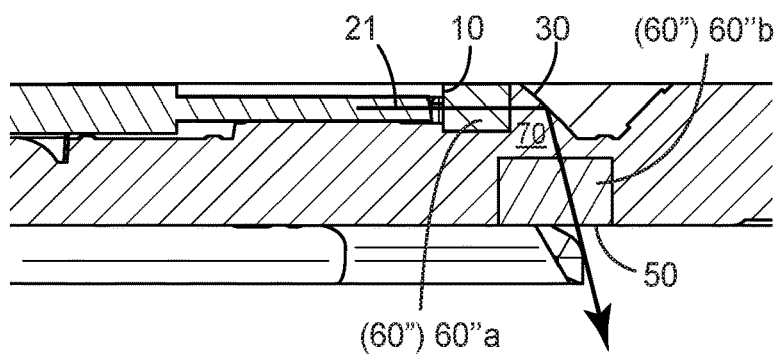

In some cases, the first portion (60) may include the input surface (10). As best shown in FIG. 5, the central light ray (21) exits the first portion (60) through a first surface (61) of the first portion and enters the second portion (70) through a second surface (74) of the second portion (70). In some cases, the first (61) and second (74) surfaces may directly contact each other with no gap therebetween as shown in FIG. 5. In other cases, the first (61) and second (74) surfaces may define a gap (62) therebetween as shown in FIG. 9. The gap (62) may be substantially filled with an optical adhesive (63).

In some other embodiments, the optical ferrule may include a glass portion (60) including glass and at least one of the light input (10) and output (50) surfaces, and a polymeric portion (70) including a polymer and disposed between the glass portion (60) and the light redirecting surface. While propagating from the light input surface (10) to the light output surface (50), the light propagates through the glass (60) and polymeric (70) portions of the optical ferrule.

Figure 12:
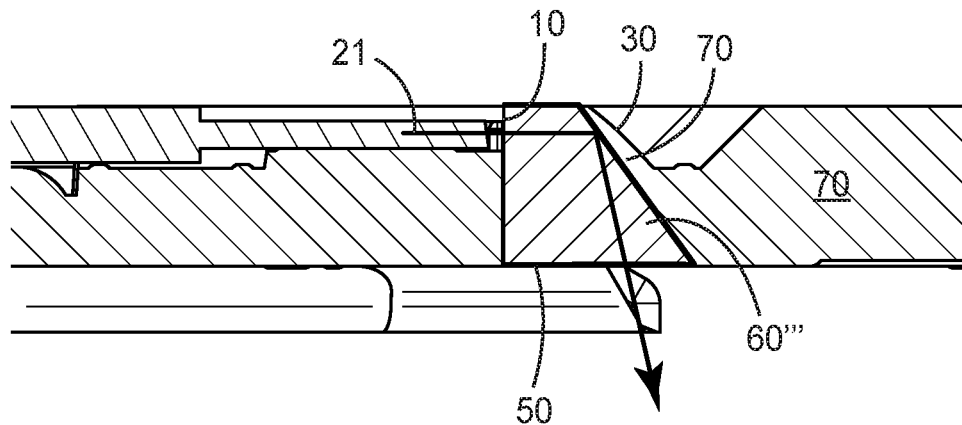

Referring to FIGS. 9-12, in some aspects, the glass portion (60, 60') includes only one of the light input (10) and output (50) surfaces. In other aspects, the glass portion (60) includes only the light input surface (10). In other aspects, the glass portion (60') includes only the light output surface (50). In some other aspects, the glass portion (60", 60''') includes both the light input and output surfaces (10, 50). For instance, in the embodiments shown in FIG. 11, the glass portion (60") includes distinct first (60"a) and second (60"b) glass portions. The first glass portion (60"a) includes the light input surface (10) and the second glass portion (60"b) includes the light output surface. In some cases, two separate receiving spaces may be provided for the two distinct glass portions (60"a, 60"b). The first receiving space may be provided on the input surface (10) in front of an end facet of the optical fibers (20), and the second receiving space may be provided on the output surface (50). In some other aspects, the glass portion (60''') may be a single continuous piece and may have a trapezoidal cross-section, as best seen in FIG. 12. The glass portion (60''') may be a single continuous insert that extends from the input surface to the output surface of the ferrule. A glass portion with trapezoidal cross section may help reduce the reflected light at the interfaces from getting back to the optical fiber, thus achieving better return loss.

In some aspects, when an optical fiber (20) is attached to the optical ferrule (200), light (21) from the optical fiber enters the optical ferrule through the input surface (10) and exits the optical ferrule through the output surface (50) after propagating through the first (60) and second (70) portions of the optical ferrule. While propagating through the first portion (60), at least 70% of a power of the light may be confined within the first portion (60). In some cases, at least 80%, or at least 90%, or at least 95% of the power of the light may be confined within the first portion (60).

Figure 7:
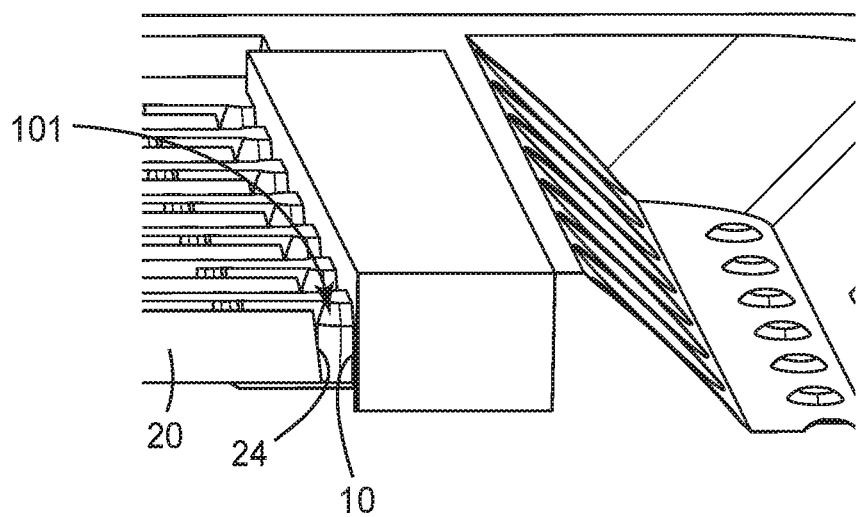
FIG. 7 schematically shows a partial view of the optical ferrule showing the end facet of the optical waveguide and the input surface of the ferrule according to some aspects of the disclosure.
Figure 8:
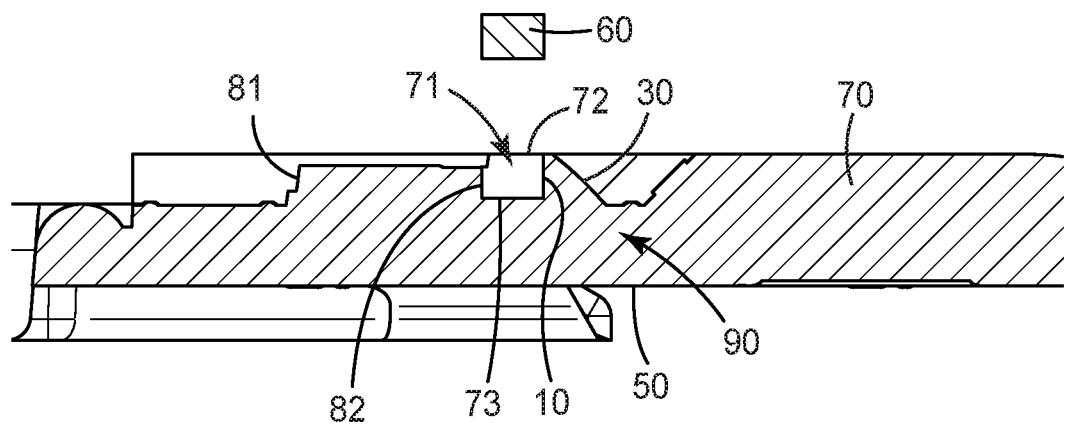
FIG. 8 schematically shows a cross sectional view of the optical ferrule according to some other aspects of the disclosure.

In some embodiments, as illustrated in FIGS. 5-8, the groove (80) for receiving and supporting the optical waveguide (20) may include opposing open front (81) and back (82) ends. The optical ferrule may include a light redirecting member (90) having an input surface (10) for receiving light (21) from the optical waveguide (20) received and supported in the groove (80). The light redirecting member (90) also includes a light redirecting side (30) for changing a direction (40) of light (22) received from the input surface (FIG. 4). The open back end (82) of the groove (80) may be disposed between the open front end (81) of the groove (80) and the input surface (10) as best seen in FIG. 8. The open back end (82) of the groove and input surface (10) define a recessed region (71) therebetween. An optically transparent glass insert (60) may be disposed in the recessed region (71), the glass insert substantially conforming in shape to an internal shape of the recessed region (71). The glass insert (60) may be a single continuous piece (60) that covers all optical fibers attached to the ferrule. In some cases, the glass insert (60) may have a trapezoidal cross-section conforming to a similar internal shape of the recessed region (71). The glass insert (60) with trapezoidal cross section may help reduce the reflected light at the interfaces from getting back to the optical fiber, thus achieving better return loss. In some cases, the glass insert (60) may include the input surface (10). According to this embodiment, the central light ray (21) from the optical waveguide (20) received and supported by the groove (80) propagates through the glass insert (60) before being received and redirected by the light redirecting side (30).

In some aspects of the disclosure, the recessed region (71) may define an open top (72) and includes a closed bottom (73) as shown in FIG. 8. In other aspects, the recessed region (70') may be a through opening defining an open top (72') and an open bottom (73') as shown in FIGS. 13-15.

Figure 13:
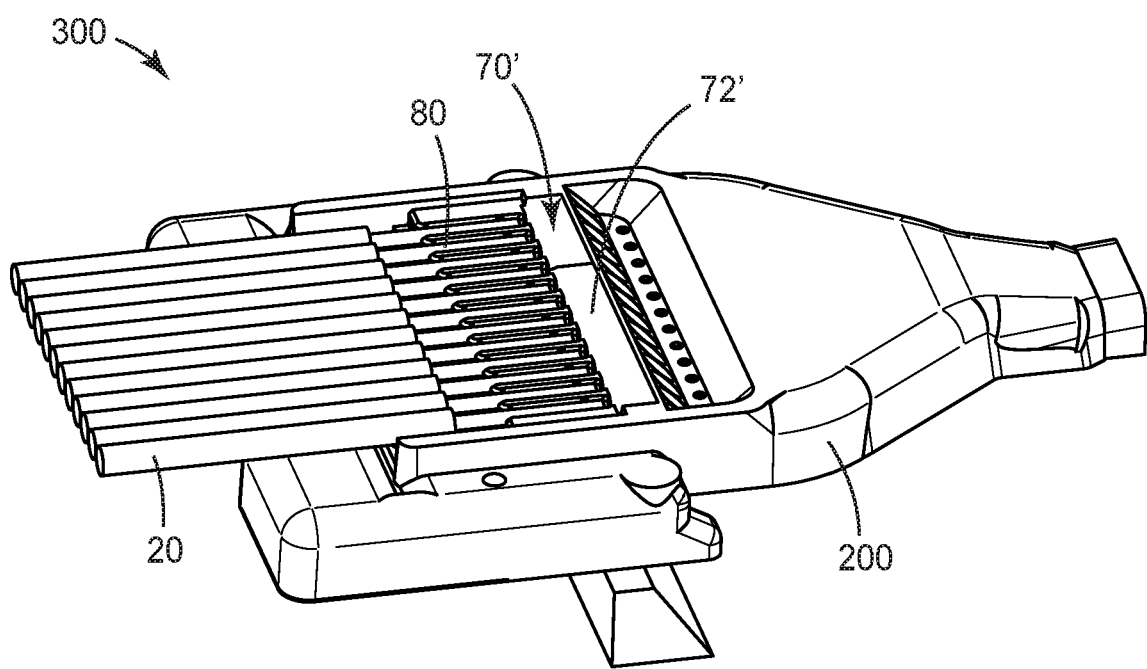
FIGS. 13-15 schematically show different views of an optical ferrule assembly according to some aspects of the disclosure.
Figure 14:
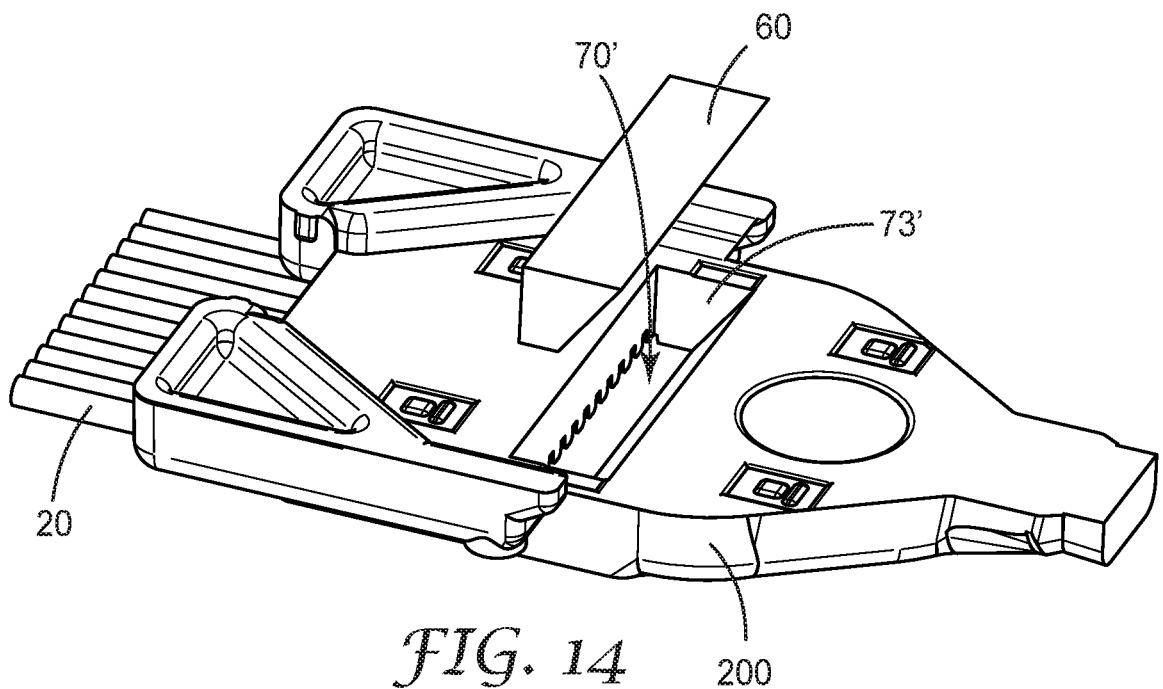
Figure 15:
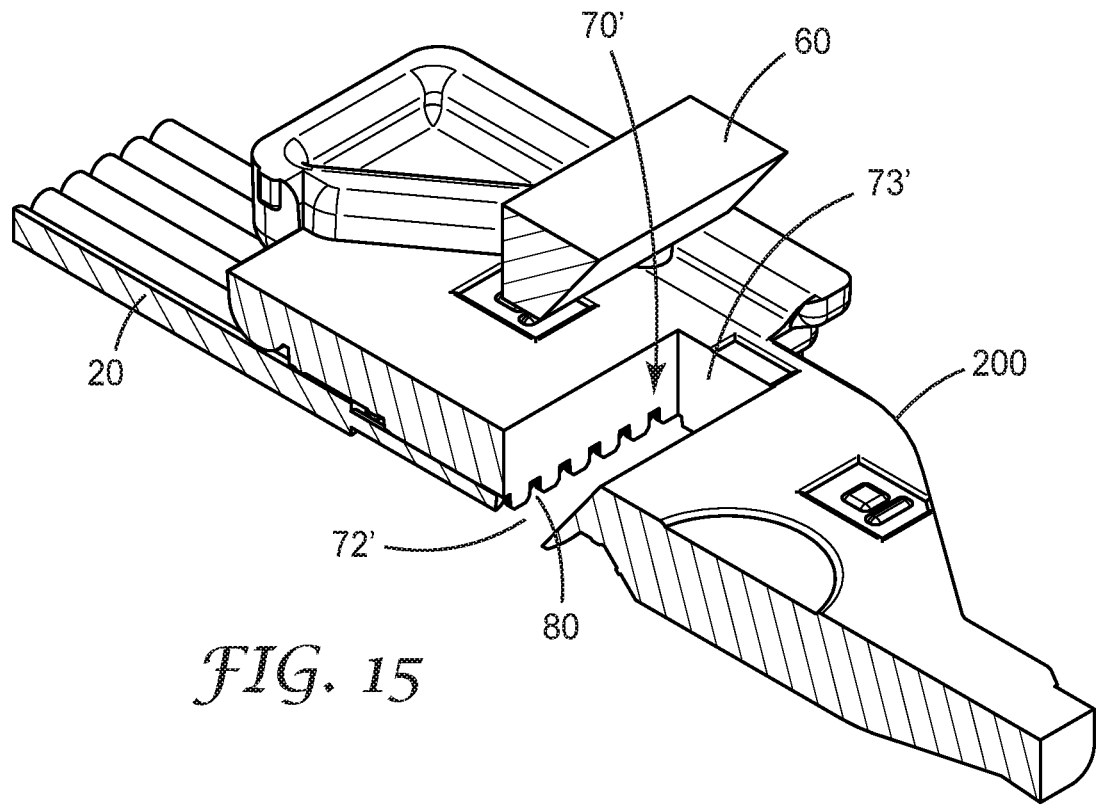

FIGS. 13-15 show different views of an optical ferrule assembly (300) including an optical ferrule (200) according to one or more embodiments described in this disclosure and at least one optical waveguide (20) received and supported in the groove (80) of the optical ferrule. In some embodiments, as best seen in FIG. 7, a gap (101) may be provided between an end facet (24) of the optical waveguide (20) and the input surface (10). In some aspects, the gap (101) may be provided between the end facet (24) of the optical waveguide (20) and the glass portion (60) that includes the light input surface (10). The gap (101) between the end facet (24) and the input surface (10), or between the end facet (24) and the glass portion (60) having the input surface (10), may be less than about 2 microns long. The gap (101) may be substantially filed with an adhesive (100), as best seen in FIG. 5. The adhesive (100) may be any substance which may have a refractive index that is similar or identical to the material of the first portion (60) having the first composition. In some cases the glass portion (60) may include teeth for shortening the gap (101) between the end facets (24) and the glass portion (60) to reduce the impact of the adhesive on the optical performance.

Figure 16:
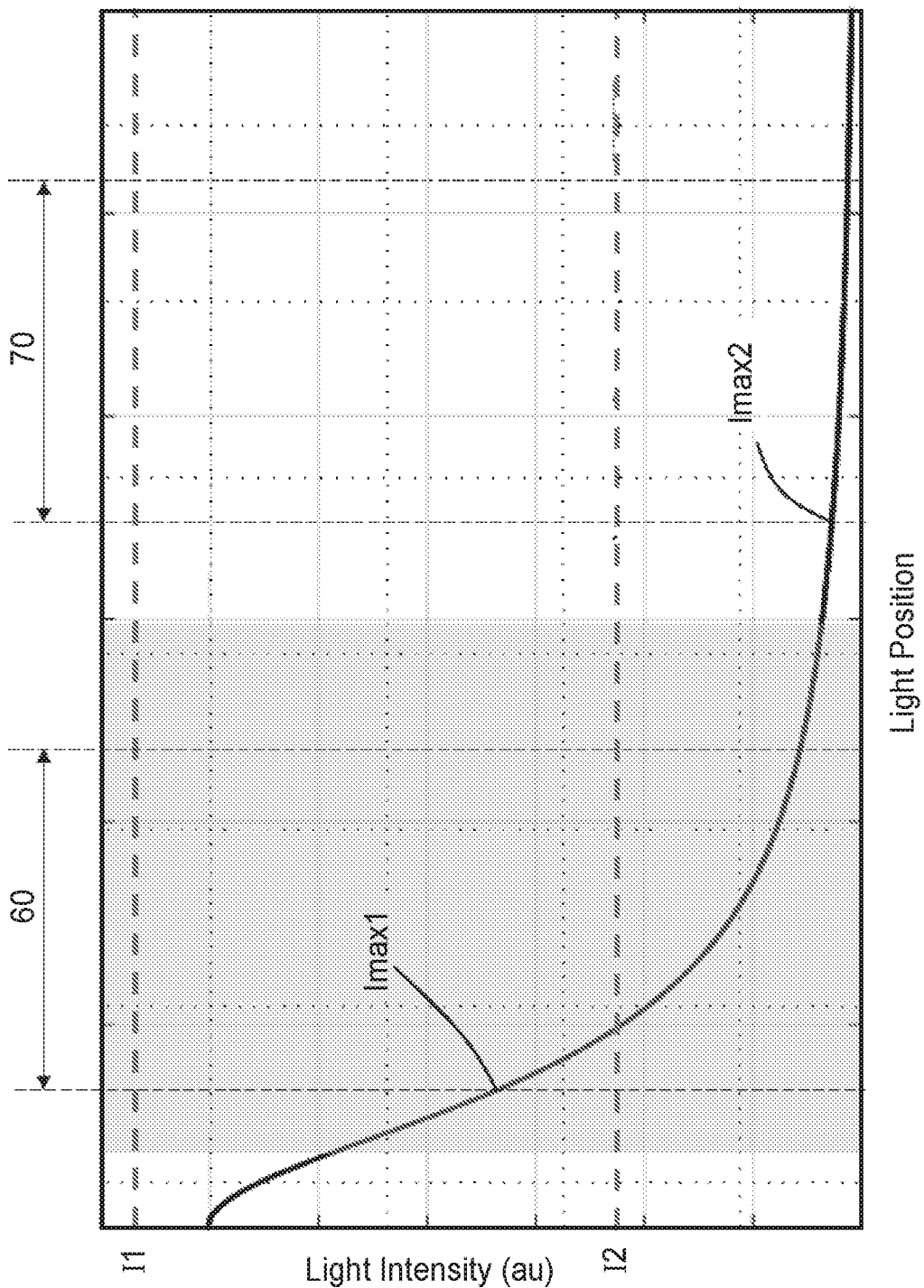
FIG. 16 shows a graphical representation of the optical intensity of light entering the optical ferrule and propagating through distinct first and second ferrule portions.

Other embodiments of the disclosure relate to a hybrid optical ferrule (200) including a light input surface (10), a light redirecting side (30) and a light output surface (50). The hybrid optical ferrule (200) includes a first ferrule portion (60) and a second ferrule portion (70). In some aspects, the first ferrule portion (60) may include glass and the second ferrule portion (70) may include a polymer. As graphically shown in FIG. 16, the first ferrule portion (60) has a first optical intensity damage threshold I1, and the second ferrule portion (70) has a second optical intensity damage threshold I2. In some embodiments, the relationship between the two optical intensity damage thresholds may be such that $I2 \leq I1/5$. In some cases, $I2 \leq I1/50$. In some other cases, $I2 \leq I1/500$ The hybrid optical ferrule (200) is so configured that light (21) entering the optical ferrule (200) through the light input surface (10) exits the optical ferrule though the light output surface (50) after being redirected by the light redirecting side (30) and propagating through the first (60) and second ferrule portions (70). The light (21) has a maximum intensity Imax1 while propagating through the first ferrule portion (60). The light (21) has a maximum intensity Imax2 while propagating through the second ferrule portion (70). The first and second ferrule portions (60, 70) may be arranged such that $Imax2 < I2 < Imax1 < I1$.

The process for bonding the glass portion (60) in the ferrule may be combined with the fiber attachment process. The optical fibers may be aligned in respective grooves of the ferrule. The glass portion (60) may then be inserted in the recessed region (71). For instance, the glass portion may be prepared from suitable materials such as fused silica, borosilicate, Pyrex, calcium fluoride ($CaF_2$), Quartz crystal, Silicon, YAG, ZnS, etc. The recessed region (71) may be formed in existing ferrules using laser ablation, FIB milling, machining, etching, RIE, or ICP techniques. In other instances, the recessed region may be formed integrally while manufacturing the ferrule. In some cases, the recessed region (71) may need to be tapered in a direction normal to the output surface (50) with precisely controlled pinch points for controlling the insertion and securing of the glass portion within the recessed region. Curable adhesives may be dispensed in the gap (101) between the end facets (24) of the optical fibers and the glass portion (60), and in the gap (62) between the glass portion (60) and the polymer portion (70). Upon wicking, the adhesives may be cured to obtain the hybrid optical ferrule.

In an expanded beam hybrid optical ferrule according to the disclosure, the central light ray (21) from the optical fibers (20) diverges. According to some embodiments, the diverging light ray passes through the adhesive (100) between the end facet (24) of the optical waveguide and the glass portion (60), which experiences the highest power density. The diverging light ray (21) subsequently passes through the glass portion (60) with the second highest power density and then continues to diverge. Since the refractive index of the glass portion is lower than the polymeric portion (70) of the optical ferrule, the light diverges more as compared to a ferrule made completely of polymer, which enhances the handling of high power density in the optical path from the optical fibers on the ferrule and reduces or eliminates the photodegradation.

The invention claimed is:

1. An optical ferrule comprising:
   an input surface for receiving and transmitting a central light ray from an optical fiber attached to the optical ferrule;
   a light redirecting side for receiving along a first direction the central light ray transmitted by the input surface and redirecting the received light along a different second direction, the redirected central light ray exiting the optical ferrule through an output surface of the optical ferrule, such that as the central light ray propagates in the optical ferrule from the input surface to the output surface, the central light ray propagates through distinct first and second portions of the optical ferrule having different respective first and second compositions, wherein when an optical fiber is attached to the optical ferrule, light from the optical fiber enters the optical ferrule through the input surface and exits the optical ferrule through the output surface after propagating through the first and second portions of the optical ferrule, such that while propagating through the first portion, at least 80% of a power of the light is confined within the first portion.

2. The optical ferrule of claim 1, wherein the first composition comprises glass and the second composition comprises a polymer, wherein the optical ferrule defines a receiving space therein, wherein the first portion is disposed within the receiving space, and wherein the first portion comprises the input surface.

3. The optical ferrule of claim 1, wherein the central light ray exits the first portion through a first surface of the first portion and enters the second portion through a second surface of the second portion.

4. The optical ferrule of claim 1, wherein the first portion is a glass portion comprising glass and at least one of the input and output surfaces, and the second portion is a polymeric portion comprising a polymer and disposed between the glass portion and the light redirecting surface.

5. The optical ferrule of claim 4, wherein the glass portion comprises only one of the light input and output surfaces.

6. A hybrid optical ferrule comprising a light input surface, a light redirecting side and a light output surface, a first ferrule portion having a first optical intensity damage threshold I1, and a second ferrule portion having a second optical intensity damage threshold I2, $I2 \leq I1/5$, the hybrid optical ferrule so configured that light entering the optical ferrule through the light input surface exits the optical ferrule though the light output surface after being redirected by the light redirecting side and propagating through the first and second ferrule portions, wherein the light has maximum intensities Imax1 and Imax2 while propagating through the respective first and second ferrule portions, the first and second ferrule portions so arranged that $Imax2 < I2 < Imax1 < I1$.

7. The hybrid optical ferrule of claim 6, wherein the first ferrule portion comprises glass and the second ferrule portion comprises a polymer.

8. The hybrid optical ferrule of claim 6, wherein $I2 \leq I1/50$.

9. The hybrid optical ferrule of claim 6, wherein $I2 \leq I1/500$.

* * * * *